United States Patent
Cho et al.

(10) Patent No.: US 10,971,304 B2
(45) Date of Patent: Apr. 6, 2021

(54) ELECTRONIC COMPONENT HAVING METAL FRAMES

(71) Applicant: SAMSUNG ELECTRO-MECHANICS CO., LTD., Suwon-si (KR)

(72) Inventors: Beom Joon Cho, Suwon-si (KR); Sang Soo Park, Suwon-si (KR); Jae Young Na, Suwon-si (KR); Woo Chui Shin, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 59 days.

(21) Appl. No.: 16/170,682

(22) Filed: Oct. 25, 2018

(65) Prior Publication Data
US 2020/0075244 A1    Mar. 5, 2020

(30) Foreign Application Priority Data

Sep. 4, 2018  (KR) .......................... 10-2018-0105440

(51) Int. Cl.
*H01G 4/232*   (2006.01)
*H01G 4/30*    (2006.01)
(Continued)

(52) U.S. Cl.
CPC .............. *H01G 4/232* (2013.01); *H01G 4/30* (2013.01); *H01G 4/012* (2013.01); *H01G 4/1227* (2013.01); *H01G 4/1245* (2013.01)

(58) Field of Classification Search
CPC .......... H01G 4/228; H01G 4/30; H01G 4/012; H01G 4/232
See application file for complete search history.

(56) References Cited

U.S. PATENT DOCUMENTS 4,346,429 A * 8/1982 DeMatos ............... H01G 4/248
                                                      361/275.1
4,516,186 A * 5/1985 Hardy ....................... H01G 2/08
                                                      361/306.3
(Continued)

FOREIGN PATENT DOCUMENTS

CN     1532860 A    9/2004
CN     1585055 A    2/2005
(Continued)

OTHER PUBLICATIONS

Notice of Office Action issued in Korean Patent Application No. 10-2018-0105440 dated Dec. 4, 2019 (English Translation).

(Continued)

*Primary Examiner* — David M Sinclair
(74) *Attorney, Agent, or Firm* — Morgan, Lewis & Bockius LLP

(57) ABSTRACT

An electronic component includes a body; external electrodes respectively disposed on opposing surfaces of the body in a first direction thereof; and a pair of metal frames connected to the external electrodes, respectively, in which each of the metal frames includes a support portion bonded to the external electrodes, and a mounting portion extending in the first direction from a lower end of the support portion and spaced apart from the body and the external electrodes, and a length of the mounting portion in a second direction perpendicular to the first direction is greater than a length of the body in the second direction.

9 Claims, 10 Drawing Sheets

(51) Int. Cl.
*H01G 4/012* (2006.01)
*H01G 4/12* (2006.01)

(56) References Cited

U.S. PATENT DOCUMENTS

| | | | | |
|---|---|---|---|---|
| 4,584,627 A | * | 4/1986 | Schilling | H01G 4/228 |
| | | | | 361/306.2 |
| 4,715,118 A | * | 12/1987 | Bernard | H01G 2/065 |
| | | | | 29/25.42 |
| 6,362,948 B1 | * | 3/2002 | Moriwaki | H01G 4/228 |
| | | | | 361/308.1 |
| 6,518,632 B1 | * | 2/2003 | Yoshida | H01G 4/228 |
| | | | | 257/393 |
| 9,911,535 B2 | | 3/2018 | Mori et al. | |
| 2002/0048142 A1 | | 4/2002 | Moriwaki et al. | |
| 2004/0145065 A1 | * | 7/2004 | Sano | H01G 9/012 |
| | | | | 257/787 |
| 2004/0183147 A1 | | 9/2004 | Togashi et al. | |
| 2005/0041367 A1 | | 2/2005 | Yoshii et al. | |
| 2013/0146347 A1 | * | 6/2013 | McConnell | H01G 4/30 |
| | | | | 174/260 |
| 2013/0271894 A1 | * | 10/2013 | Biler | H01G 4/228 |
| | | | | 361/528 |
| 2016/0240317 A1 | * | 8/2016 | Ro | H01G 4/30 |
| 2018/0075973 A1 | | 3/2018 | Ando et al. | |
| 2019/0080842 A1 | * | 3/2019 | Ando | H05K 3/301 |
| 2019/0355522 A1 | * | 11/2019 | Kanbe | H01F 27/29 |

FOREIGN PATENT DOCUMENTS

| | | | | |
|---|---|---|---|---|
| JP | H11-251176 A | | 9/1999 | |
| JP | 2000-030970 A | | 1/2000 | |
| JP | 2004-273935 A | | 9/2004 | |
| JP | 2011009435 A | * | 1/2011 | H01G 4/232 |
| JP | 2012033650 A | * | 2/2012 | H01G 4/232 |
| JP | 2018-046071 A | | 3/2018 | |
| JP | 2018-133355 A | | 8/2018 | |

OTHER PUBLICATIONS

The First Office Action issued in Chinese Application No. 201910011559.7 dated Feb. 9, 2021 (English translation).

* cited by examiner

ELECTRONIC COMPONENT HAVING METAL FRAMES

CROSS-REFERENCE TO RELATED APPLICATION(S)

This application claims the benefit of priority to Korean Patent Application No. 10-2018-0105440 filed on Sep. 4, 2018 in the Korean Intellectual Property Office, the disclosure of which is incorporated herein by reference in its entirety.

TECHNICAL FIELD

The present disclosure relates to an electronic component.

BACKGROUND

Multilayer capacitors are used in various electronic devices because they may be implemented to have small size and high capacity.

In recent years, due to the rapid rise of environmentally-friendly automobiles and electric vehicles, power driving systems in automobiles have been increased, and accordingly, demand for the multilayer capacitors required for automobiles has also increased.

Since a high level of thermal reliability, electrical reliability, and mechanical reliability are required for use as an automotive part, the performance required of multilayer capacitors is also being advanced.

Accordingly, a structure of the multilayer capacitor having strong durability against vibrations and deformation is required.

As a method for improving such durability against vibrations and deformation, there is an electronic component having a structure in which the multilayer capacitor is mounted to be spaced apart from a substrate by a predetermined distance by using a metal frame.

However, in the case in which the electronic component is mounted on the substrate, since the multilayer capacitor is supported by the metal frame and floated on the top of the substrate, the center of gravity of the electronic component is located at the top. As a result, there is a problem that a reversal defect, in which the electronic component is collapsed, may be caused when the electronic component is mounted on the substrate.

SUMMARY

An aspect of the present disclosure may provide an electronic component capable of improving durability and reliability against vibrations and deformation and preventing a reversal defect when being mounted on a substrate.

According to an aspect of the present disclosure, an electronic component may include a body; external electrodes respectively disposed on opposing surfaces of the body in a first direction of the body; and a pair of metal frames connected to the external electrodes, respectively. Each of the metal frames includes a support portion bonded to the external electrodes, and a mounting portion extending in the first direction from a lower end of the support portion and spaced apart from the body and the external electrodes, and a length of the mounting portion in a second direction perpendicular to the first direction is greater than a length of the body in the second direction.

$0.6 \leq d/t < 1.0$ may be satisfied in which dimension "t" is a total height of the electronic component in a third direction perpendicular to the first and second directions and dimension "d" is a length of the mounting portion in the second direction.

A length of the support portion in the second direction may be greater than the length of the body in the second direction.

A length of a lower portion of the support portion in the second direction may be greater than a length of an upper portion of the support portion in the second direction.

The support portion may have cutout portions formed in opposite side surfaces of a lower portion thereof.

The cutout portions may be formed in a triangular shape.

The lower portion of the support portion may be formed in a trapezoidal shape.

The body may include a dielectric layer, and first and second internal electrodes alternately disposed while having the dielectric layer interposed therebetween.

The external electrodes may include head portions disposed on the opposing surfaces of the body in the first direction, respectively; and band portions extending from the head portions to portions of upper and lower surfaces of the body and to portions of opposite side surfaces of the body in the second direction, respectively.

A conductive adhesive portion may be disposed between the head portion of the external electrode and the support portion.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
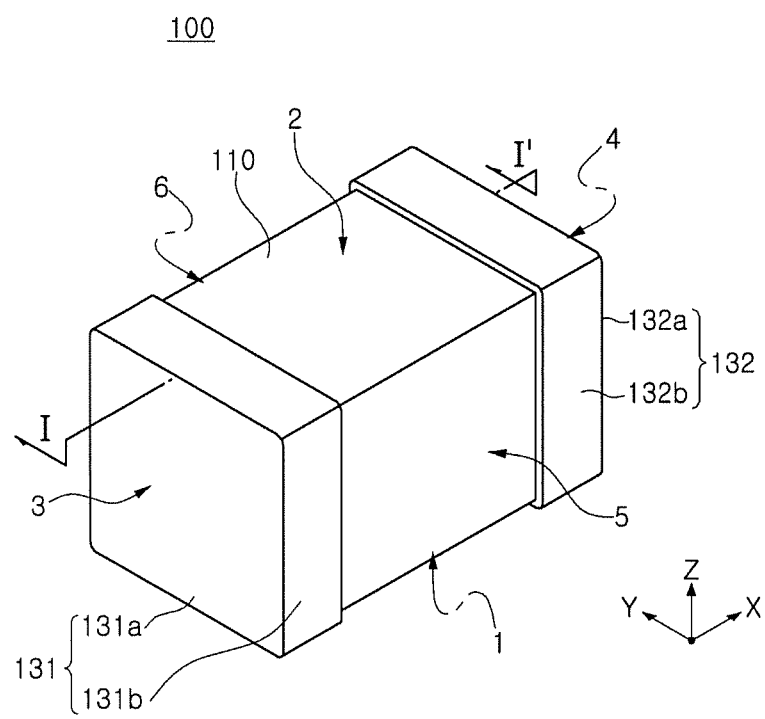
FIG. 1 is a perspective view schematically illustrating a multilayer capacitor applied to an exemplary embodiment in the present disclosure.

Hereinafter, exemplary embodiments of the present disclosure will now be described in detail with reference to the accompanying drawings.

Directions will be defined in order to clearly describe exemplary embodiments in the present disclosure. X, Y and Z in the drawings refer to a length direction, a width direction, and a thickness direction of a multilayer capacitor and an electronic component, respectively.

Here, the Z direction refers to a stacked direction in which dielectric layers are stacked in the present exemplary embodiment.

Figure 2A:
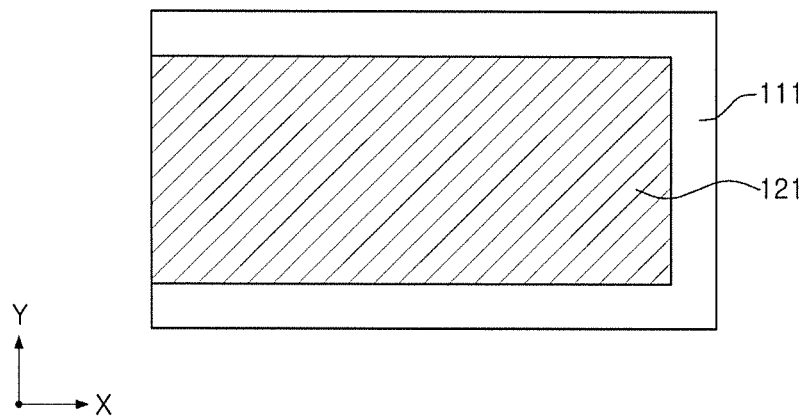
FIGS. 2A and 2B are plan views illustrating first and second internal electrodes applied to the multilayer capacitor of FIG. 1, respectively.
Figure 2B:
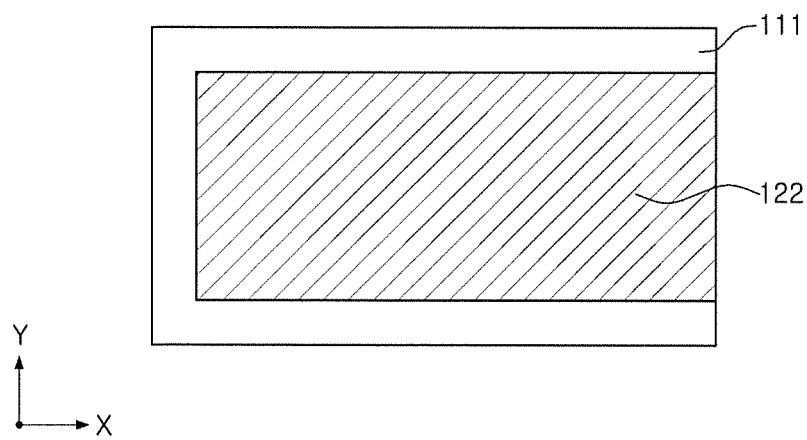
Figure 3:
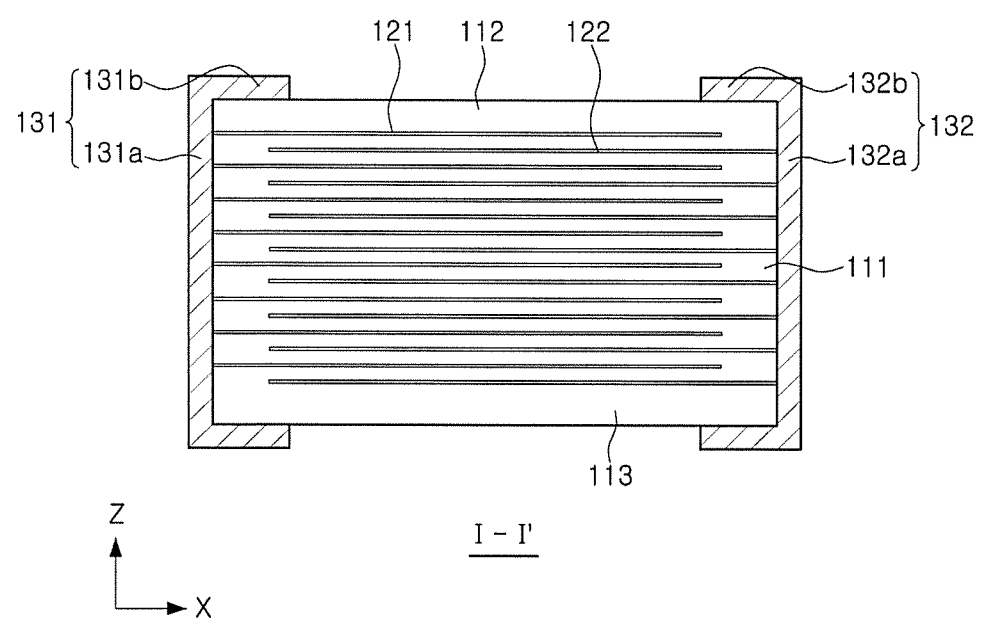
FIG. 3 is a cross-sectional view taken along a line I-I' of FIG. 1.

FIG. 1 is a perspective view schematically illustrating a multilayer capacitor applied to an exemplary embodiment in the present disclosure, FIGS. 2A and 2B are plan views illustrating first and second internal electrodes applied to the multilayer capacitor of FIG. 1, respectively, and FIG. 3 is a cross-sectional view taken along a line I-I' of FIG. 1.

First, a structure of a multilayer capacitor applied to an electronic component according to the present exemplary embodiment will be described with reference to FIGS. 1 through 3.

Referring to FIGS. 1 through 3, a multilayer capacitor 100 according to the present exemplary embodiment may include a body 110, and first and second external electrodes 131 and 132 disposed on opposite end surfaces of the body 110, respectively, in an X direction, which is a first direction of the body 110.

The body 110 may be formed by stacking a plurality of dielectric layers 111 in a Y direction of the body 110 and then sintering the plurality of dielectric layers 111. The dielectric layers 111 adjacent to each other of the body 110 may be integrated with each other so that boundaries therebetween are not readily apparent without using a scanning electron microscope (SEM).

In addition, the body 110 may include the plurality of dielectric layers ill, and first and second internal electrodes 121 and 122 having different polarities alternately disposed in a Z direction of the body 110 while having the dielectric layers 111 interposed therebetween.

In addition, the body 110 may include an active region as a portion contributing to forming a capacitance of the capacitor, and cover regions 112 and 113 disposed on upper and lower surfaces of the active region in the Z direction as margin portions.

A shape of the body 110 is not particularly limited, but may be a hexahedron shape. The body 110 may have first and second surfaces 1 and 2 opposing each other in the Z direction of the body 110, third and fourth surfaces 3 and 4 connected to the first and second surfaces 1 and 2 and opposing each other in the X direction of the body 110, and fifth and sixth surfaces 5 and 6 connected to the first and second surfaces 1 and 2, connected to the third and fourth surfaces 3 and 4, and opposing each other in the Y direction of the body 110.

The dielectric layer 111 may include a ceramic powder, for example, a $BaTiO_3$ based ceramic powder or the like.

An example of the barium titanate ($BaTiO_3$) based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, and the like, in which Ca, Zr, or the like, is partially dissolved in $BaTiO_3$, but is not limited thereto.

In addition, the dielectric layer 111 may further include a ceramic additive, an organic solvent, a plasticizer, a binder, a dispersant, and the like, in addition to the ceramic powder.

The ceramic additive may include, for example, a transition metal oxide or carbide, a rare earth element, magnesium (Mg), aluminum (Al), or the like.

The first and second internal electrodes 121 and 122, which are electrodes to which different polarities are applied, may be disposed on the dielectric layer 111 to be stacked in the Z direction of the body 110, and may be alternately disposed in the body 110 so as to opposite to each other along the Z direction of the body 110 while having one dielectric layer 111 interposed therebetween.

At this time, the first and second internal electrodes 121 and 122 may be electrically insulated from each other by the dielectric layer 111 disposed therebetween.

Meanwhile, the present disclosure illustrates and describes a structure in which the internal electrodes are staked in the Z direction of the body 110, but the present disclosure is not limited thereto and may also be applied to a structure in which the internal electrodes are stacked in the Y direction of the body 110, if necessary.

One end portion of each of the first and second internal electrodes 121 and 122 may be exposed through the third and fourth surfaces 3 and 4 of the body 110, respectively.

The end portions of the first and second internal electrodes 121 and 122 alternately exposed through the third and fourth surfaces 3 and 4 of the body 110 may be electrically connected to the first and second external electrodes 131 and 132 disposed on the opposite end surfaces of the body 110 in the X direction of the body 110, respectively, to be described below.

According to the configuration as described above, when a predetermined voltage is applied to the first and second external electrodes 131 and 132, electric charges may be accumulated between the first and second internal electrodes 121 and 122.

At this time, a capacitance of the multilayer capacitor 100 may be in proportional to an overlapping area of the first and second internal electrodes 121 and 122 overlapping with each other along the Z direction of the body 110 in the active region.

In addition, a material forming the first and second internal electrodes 121 and 122 is not particularly limited, but may be a conductive paste formed of one or more of, for example, a noble metal material such as platinum (Pt), palladium (Pd), a palladium-silver (Pd—Ag) alloy, or the like, nickel (Ni), and copper (Cu).

At this time, a method of printing the conductive paste may be a screen printing method, a gravure printing method, or the like, but is not limited thereto.

Voltages having different polarities may be provided to the first and second external electrodes 131 and 132, and the first and second external electrodes 131 and 132 may be disposed on the opposite end surfaces of the body 110 in the X direction of the body 110, and may be electrically connected to the exposed end portions of the first and second internal electrodes 121 and 122, respectively.

The first external electrode 131 may include a first head portion 131a and a first band portion 131b.

The first head portion 131a may be disposed on the third surface 3 of the body 110, and may be in contact with the end portion of the first internal electrode 121 exposed to the outside through the third surface 3 of the body 110 to serve to electrically connect the first internal electrode 121 and the first external electrode 131 to each other.

The first band portion 131b may be a portion extending from the first head portion 131a to portions of the first, second, fifth, and sixth surfaces 1, 2, 5, and 6 of the body 110 to improve fixing strength.

The second external electrode 132 may include a second head portion 132a and a second band portion 132b.

The second head portion 132a may be disposed on the fourth surface 4 of the body 110, and may be in contact with the end portion of the second internal electrode 122 exposed to the outside through the fourth surface 4 of the body 110 to serve to electrically connect the second internal electrode 122 and the second external electrode 132 to each other.

The second band portion 132b may be a portion extending from the second head portion 132a to portions of the first, second, fifth, and sixth surfaces 1, 2, 5, and 6 of the body 110 to improve fixing strength.

Meanwhile, the first and second external electrodes 131 and 132 may further include a plating layer.

The plating layer may include first and second nickel (Ni) plating layers, and first and second tin (Sn) plating layers covering the first and second Ni plating layers, respectively.

Figure 4A:
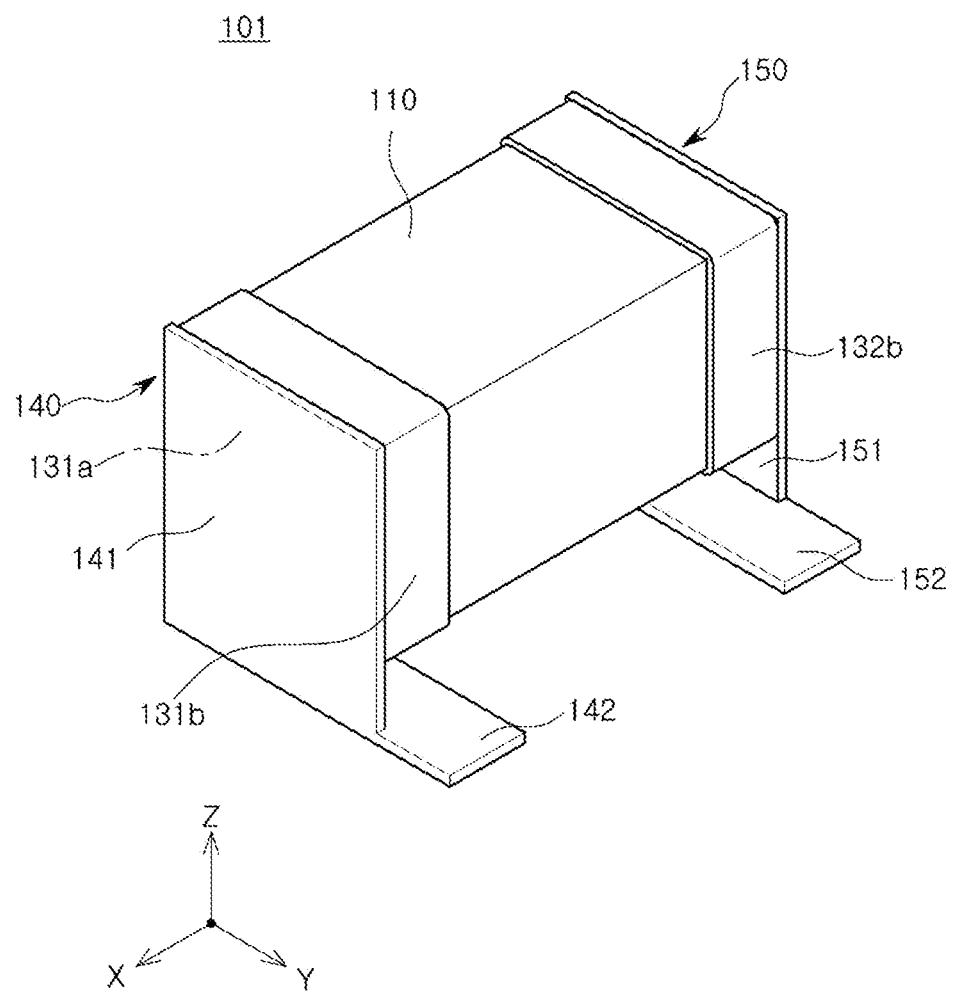
FIGS. 4A and 4B are perspective views illustrating a schematic structure of an electronic component according to an exemplary embodiment in the present disclosure.
Figure 4B:
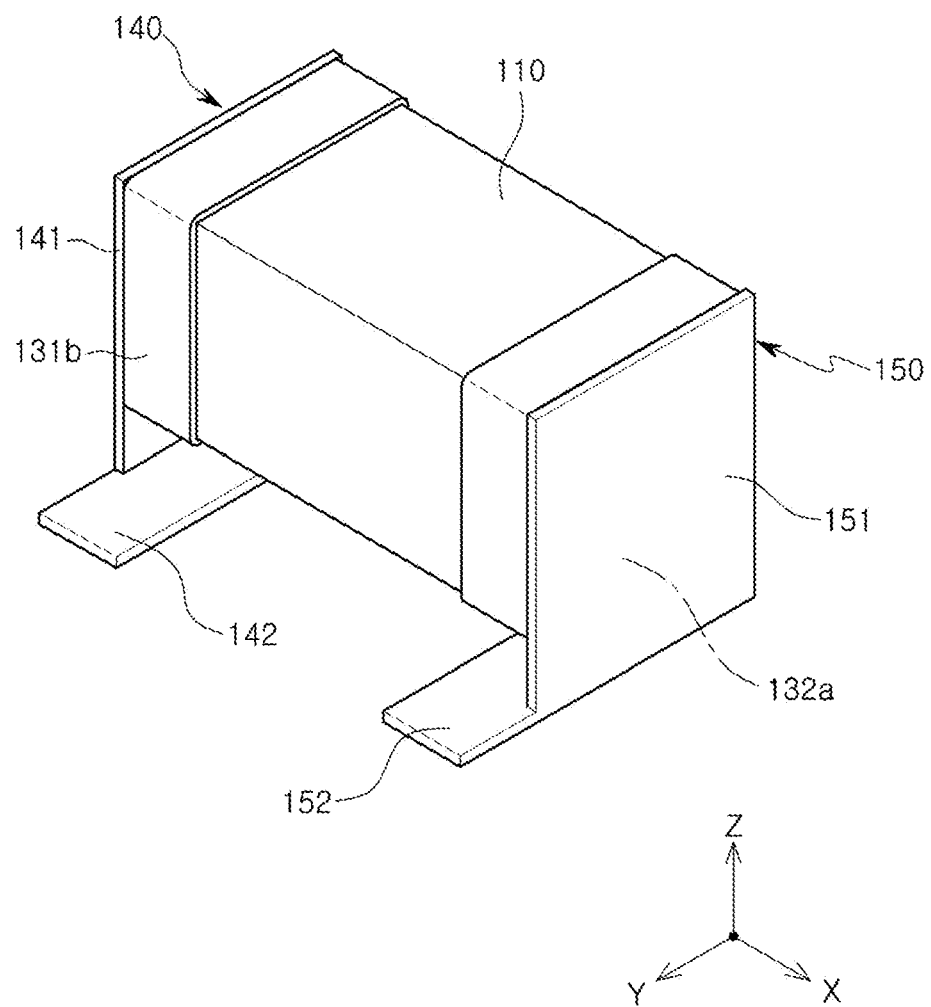

FIGS. 4A and 4B are perspective views illustrating a schematic structure of an electronic component according to an exemplary embodiment in the present disclosure.

Referring to FIGS. 4A and 4B, an electronic component 101 according to the present exemplary embodiment may include the multilayer capacitor 100, and first and second metal frames 140 and 150 connected to the first and second external electrodes 131 and 132 of the multilayer capacitor 100, respectively.

The first metal frame 140 may include a first support portion 141 and a first mounting portion 142.

The first support portion 141 may be a portion which is perpendicular to a mounting surface, is elongated in the Y direction, and is bonded to the first head portion 131a of the first external electrode 131, and may be electrically and physically connected to the first head portion 131a of the first external electrode 131.

The length of the first support portion 141 in the Y direction can be uniform along the Z direction perpendicular to the X and Y directions.

At this time, a conductive adhesive portion (not illustrated) may be disposed between the first external electrode 131 and the first support portion 141.

According to the present exemplary embodiment, the conductive adhesive portion may be disposed on the first head portion 131a of the first external electrode 131.

Such a conductive adhesive portion may be formed of a high temperature solder, a conductive adhesive material, or the like, but is not limited thereto.

The first mounting portion 142 may be a portion extending in the X direction, which is the first direction from a lower end of the first support portion 141 and disposed to be horizontal with respect to the mounting surface, and may serve as a connection terminal when the electronic component is mounted on the substrate.

At this time, a length of the first mounting portion 142 in the Y direction, which is the second direction perpendicular to the X direction, which is the first direction, may be greater than lengths of the body 110 and the first head portion 131a of the first external electrode 131 in the Y direction of the body 110, such that the first mounting portion 142 may protrude to one side or opposite sides of the body 110 in the Y direction of the body 110. Therefore, the length of the first mounting portion 142 in the Y direction can be larger than a maximum length of the first support portion 141 in the Y direction.

At this time, when a width of the electronic component 101 in the Y direction is W and a length of the first mounting portion 142 in the Y direction is d, d/W may satisfy $1.0<d/W\leq1.3$.

In a case in which d/W exceeds 1.3, a problem may occur in which a mounting area when the electronic component is mounted on the substrate is increased.

In addition, the first mounting portion 142 may be disposed to be spaced apart from a lower surface of the multilayer capacitor 100 by a predetermined distance in the Z direction.

In addition, when the total height of the electronic component 101 is t and a length of the first mounting portion 142 in the Y direction is d, $0.6\leq d/t<1.0$ may be satisfied.

The second metal frame 150 may include a second support portion 151 and a second mounting portion 152.

The second support portion 151 may be a portion which is perpendicular to a mounting surface, is elongated in the Y direction, and is bonded to the second head portion 132a of the second external electrode 132, and may be electrically and physically connected to the second head portion 132a of the second external electrode 132.

At this time, a conductive adhesive portion may be disposed between the second external electrode 132 and the second support portion 151.

According to the present exemplary embodiment, the conductive adhesive portion may be disposed on the second head portion 132a of the second external electrode 132.

Such a conductive adhesive portion may be formed of a high temperature solder, a conductive adhesive material, or the like, but is not limited thereto.

The second mounting portion 152 may be a portion extending in the X direction, which is the first direction from a lower end of the second support portion 151 and disposed to be horizontal with respect to the mounting surface, and may serve as a connection terminal when the electronic component is mounted on the substrate.

At this time, a length of the second mounting portion 152 in the Y direction, which is the second direction perpendicular to the X direction, which is the first direction, may be greater than lengths of the body 110 and the second head portion 132a of the second external electrode 132 in the Y direction of the body 110, such that the second mounting portion 152 may protrude to one side or opposite sides of the body 110 in the Y direction of the body 110.

At this time, when a width of the electronic component 101 in the Y direction is W and a length of the second mounting portion 152 in the Y direction is d, d/W may satisfy $1.0<d/W\leq1.3$.

In a case in which d/W exceeds 1.3, a problem may occur in which a mounting area when the electronic component is mounted on the substrate is increased.

In addition, the second mounting portion 152 may be disposed to be spaced apart from a lower surface of the multilayer capacitor 100 by a predetermined distance in the Z direction.

In addition, when the total height of the electronic component 101 is t and a length of the second mounting portion 152 in the Y direction is d, $0.6\leq d/t<1.0$ may be satisfied.

A multilayer capacitor according to the related art has a structure in which a capacitor body and a substrate are in direct contact with each other by a solder when being mounted on the substrate. Here, since heat or mechanical deformation generated in the substrate is directly transferred to the multilayer capacitor, it is difficult to secure a high level of reliability.

The electronic component according to the present exemplary embodiment may secure an interval between the multilayer capacitor 100 and the substrate by bonding the first and second metal frames 140 and 150 onto the opposite end surfaces of the multilayer capacitor 100. As a result, when the electronic component 101 is mounted on the substrate, stress from the substrate may be prevented from being directly transferred to the multilayer capacitor 100, such that thermal reliability, mechanical reliability, and tolerance to warpage deformation of the electronic component 101 may be improved.

Meanwhile, in the case of which the electronic component using the metal frame, since the multilayer capacitor is supported by the metal frame and floated on the top of the substrate when being mounted on the substrate, the center of gravity of the electronic component is located at the top. As a result, a reversal defect in which the electronic component is collapsed is easily caused when the electronic component is mounted on the substrate.

In the electronic component according to the present exemplary embodiment, the length of the mounting portion in the Y direction is greater than the lengths of the body and the head portion of the external electrode in the Y direction, and a contact area of the mounting portion is relatively increased to stably support the electronic component, such that the occurrence of the reversal defect may be prevented when the electronic component is mounted on the substrate.

Meanwhile, in a case in which the lengths of the first and second mounting portions are excessively increased, areas of the first and second mounting portions are increased by the increased lengths of the first and second mounting portions, such that the mounting area may be increased when the electronic component is mounted on the substrate.

Accordingly, when a height of the electronic component is t and a length of the mounting portion in the Y direction is d, it is necessary to appropriately adjust d/t.

Figure 7:
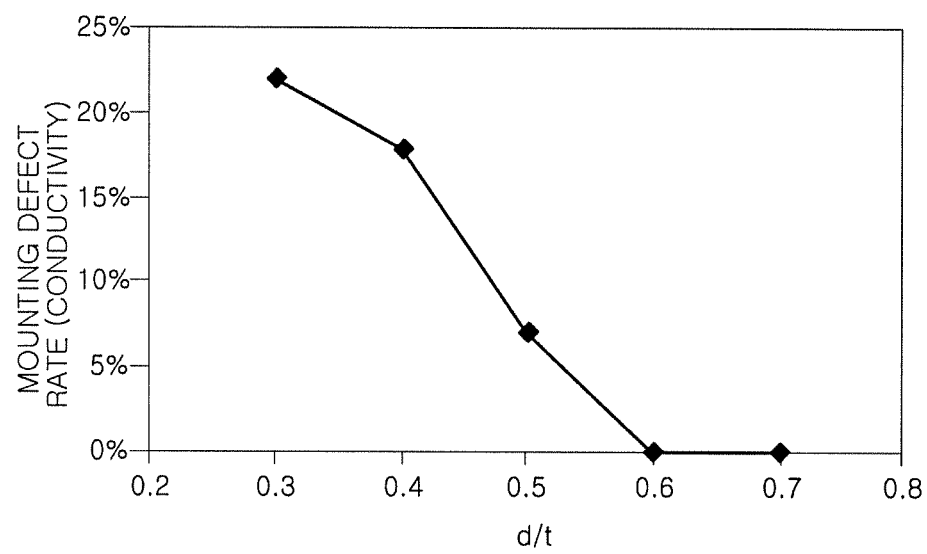
FIG. 7 is a graph illustrating a mounting defect rate according to a change in a ratio of a length of a mounting portion to a height of the electronic component.

FIG. 7 is a graph illustrating a mounting defect rate according to a change in d/t.

The mounting process defect rate was determined by using a chip mounter to mount hundred electronic components on the substrate in the range of d/t of 0.3 to 0.7, and then checking the extent that the electronic components collapse.

Referring to FIG. 7, in a case in which d/t is 0.5 or less, since the areas of the mounting portions of the metal frames are too large, it may be seen that a deflection phenomenon of the top of the center of gravity of the electronic component occurs, the metal frames do not support the multilayer capacitor, and the reversal defect occurs.

In addition, in a case in which d/t is 0.6 or more, the reversal defect does not occur. Therefore, in the case in which d/t is 0.6 or more, it may be determined that the mounting portions of the metal frames sufficiently support the multilayer capacitor.

However, when d/t is increased, the mounting area of the electronic component is also increased. Therefore, a maximum value of d may not exceed t.

Therefore, it may be seen that a range of d/t capable of securing fixing strength with the substrate is $0.6 \leq d/t < 1.0$.

Figure 5A:
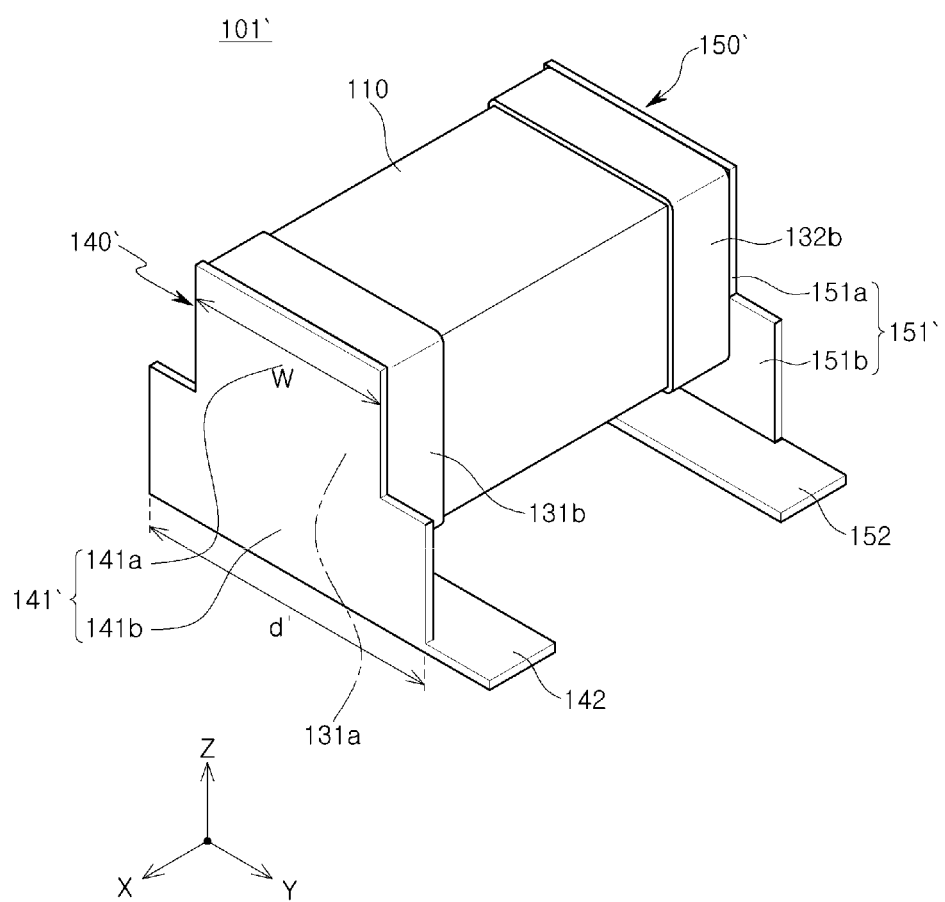
FIGS. 5A and 5B are perspective views illustrating a schematic structure of an electronic component according to another exemplary embodiment in the present disclosure.
Figure 5B:
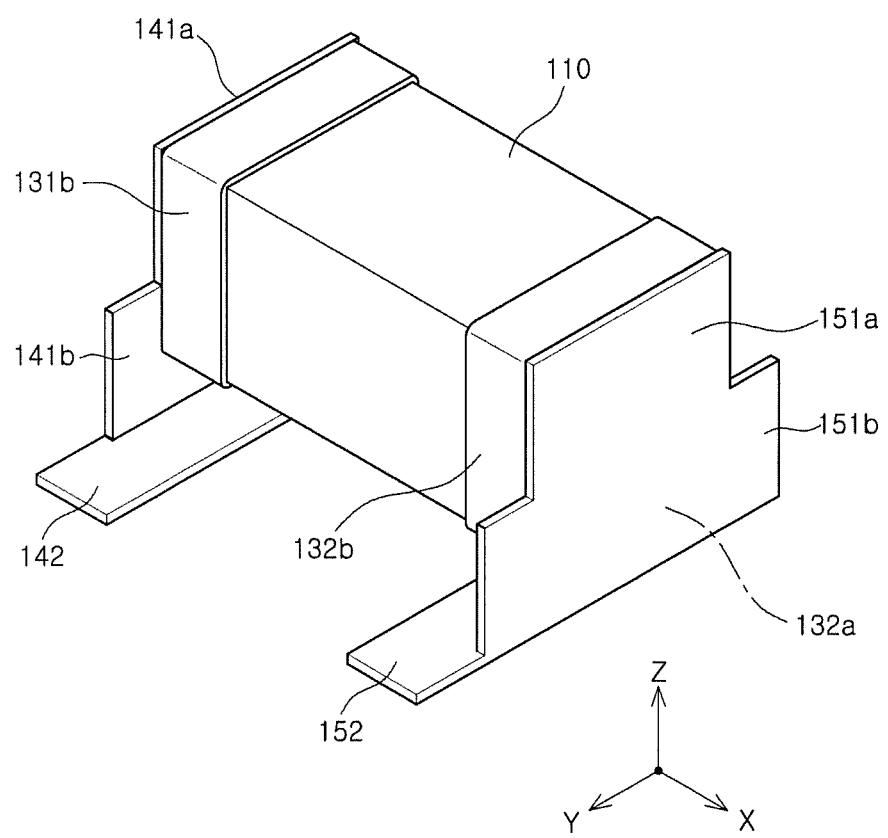

FIGS. 5A and 5B are perspective views illustrating a schematic structure of an electronic component according to another exemplary embodiment in the present disclosure.

Here, since the structure of the multilayer capacitor and the structure of the mounting portion of the metal frame are similar to those of the exemplary embodiment described above, a detailed description thereof will be omitted in order to avoid an overlapping description. A vertical portion of the metal frame having a structure different from that of the exemplary embodiment described above is illustrated and a detailed description will be provided based on the vertical portion.

Referring to FIGS. 5A and 5B, in an electronic component 101' according to the present exemplary embodiment, a length d' of a first support portion 141' of a first metal frame 140 in the Y direction may be greater than a length W of the body 110 in the Y direction.

In addition, an upper portion 141a of the first support portion 141' may have the same length W in the Y direction as those of the body 110 and the first head portion 131a of the first external electrode 131.

In addition, a lower portion 141b of the first support portion 141' extends to one side or opposite sides in the Y direction with respect to the body 110 and the first head portion 131a of the first external electrode 131 in the Y direction, such that a length d of the lower portion 141b of the first support portion 141' in the Y direction may be greater than the lengths of the body 110 and the first head portion 131a in the Y direction. A length of a second support portion 151' of a second metal frame 150' in the Y direction may be greater than the length of the body 110 in the Y direction.

In addition, according to the present exemplar embodiment, an upper portion 151a of the second support portion 151' may have the same length in the Y direction as those of the body 110 and the second head portion 132a of the second external electrode 132.

In addition, a lower portion of the second support portion 151' extends to one side or opposite sides in the Y direction with respect to the body 110 and the second head portion 132a of the second external electrode 132 in the Y direction, such that a length of the lower portion 151b of the second support portion 151' in the Y direction may be greater than the lengths of the body 110 and the second head portion 132a in the Y direction.

Figure 6A:
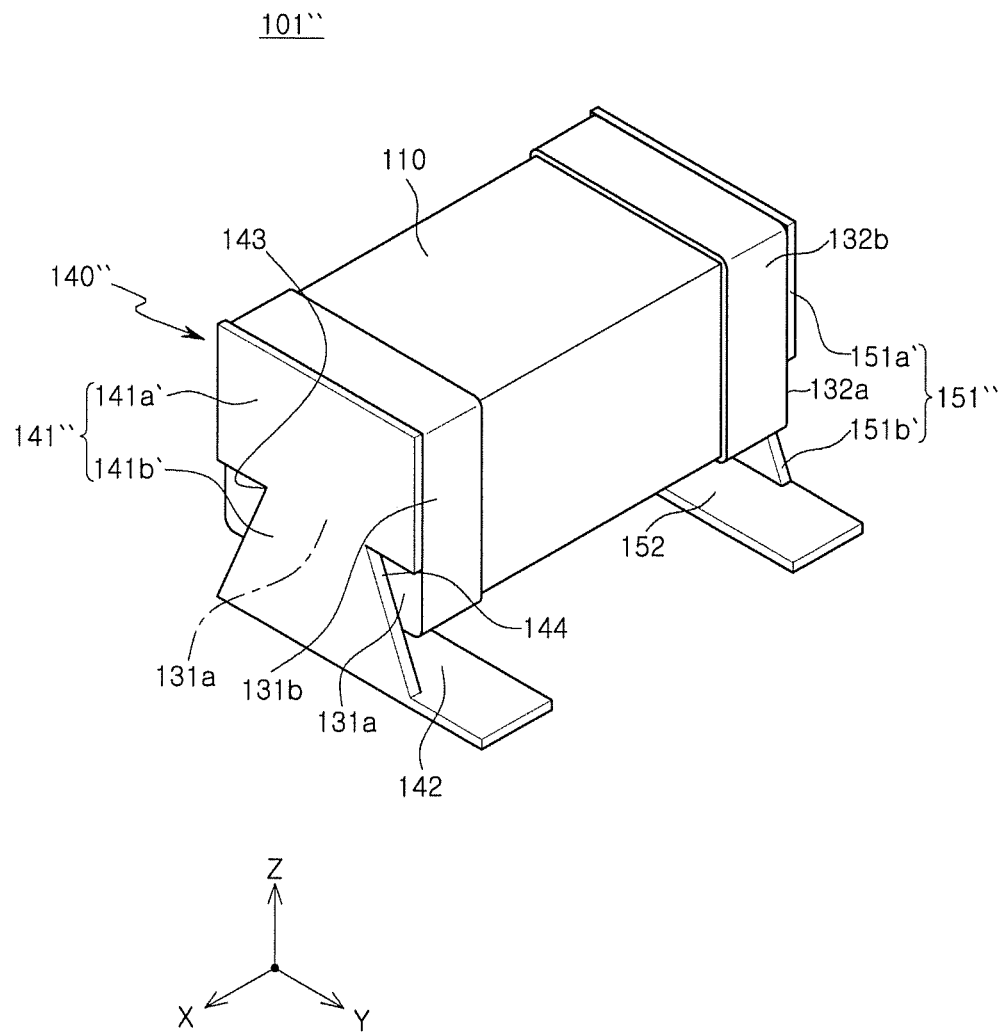
FIGS. 6A and 6B are perspective views illustrating a schematic structure of an electronic component according to another exemplary embodiment in the present disclosure.
Figure 6B:
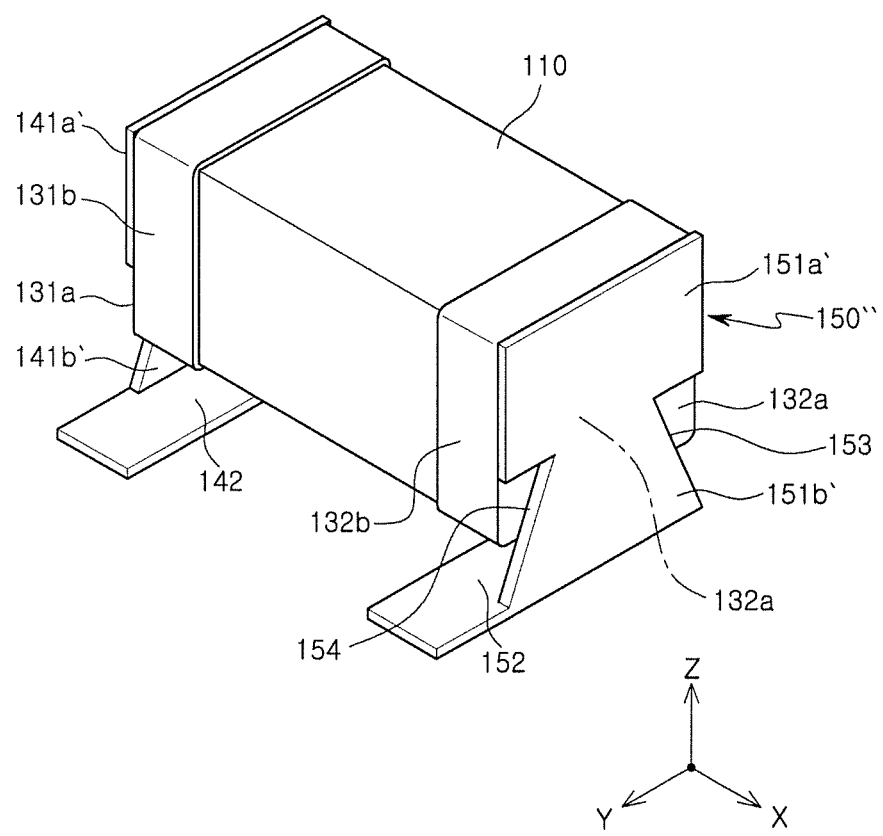

FIGS. 6A and 6B are perspective views illustrating a schematic structure of an electronic component according to another exemplary embodiment in the present disclosure.

Here, since the structure of the multilayer capacitor and the structure of the mounting portion of the metal frame are similar to those of the exemplary embodiment described above, a detailed description thereof will be omitted in order to avoid an overlapping description. A vertical portion of the metal frame having a structure different from that of the exemplary embodiment described above is illustrated and a detailed description will be provided based on the vertical portion.

Referring to FIGS. 6A and 6B, in an electronic component 101" according to the present exemplary embodiment, an upper portion 141a' of a first support portion 141" of a first metal frame 140" may have the same length in the Y direction as those of the body 110 and the first head portion 131a of the first external electrode 131.

In addition, cutout portions 143 and 144 may be formed in opposite side surfaces of a lower portion 141b' of the first support portion 141" in the Y direction and may be formed in a triangular shape, such that the lower portion 141b' of the first support portion 141" may be formed in a trapezoidal shape.

An upper portion 151a' of a second support portion 151" of a second metal frame 150" may have the same length in the Y direction as those of the body 110 and the second head portion 132a of the second external electrode 132.

In addition, cutout portions 153 and 154 may be formed in opposite side surfaces of a lower portion 151b' of the second support portion 151" in the Y direction and may be formed in a triangular shape, such that the lower portion 151b' of the second support portion 151" may be formed in a trapezoidal shape.

As set forth above, according to the exemplary embodiment in the present disclosure, durability and reliability of the multilayer capacitor against the vibration and deformation may be improved, and since the width of the mounting portion is greater than those of the body and the head portions of the external electrodes, the reversal defect of the electronic component may be prevented when the electronic component is mounted on the substrate.

While exemplary embodiments have been shown and described above, it will be apparent to those skilled in the art that modifications and variations could be made without departing from the scope of the present invention as defined by the appended claims.

What is claimed is:

1. An electronic component comprising:
   a body;
   external electrodes respectively disposed on opposing surfaces of the body in a first direction of the body; and
   a pair of metal frames connected to the external electrodes, respectively,
   wherein
   each of the pair of metal frames includes a support portion bonded to the external electrodes, and a mounting portion extending in the first direction from a lower end of the support portion and spaced apart from the body and the external electrodes,
   a length of the mounting portion in a second direction perpendicular to the first direction is greater than a maximum length of the support portion in the second direction,
   the support portion includes an upper portion and a lower portion, the lower portion being connected to the mounting portion,
   the length of the lower portion in the second direction is greater than a length of each of the external electrodes in the second direction, and
   a length of the upper portion of the support portion in the second direction is substantially similar to a length of each of the external electrodes in the second direction, and the lower portion of the support portion is formed to have a rectangular shape.

2. The electronic component of claim 1, wherein $0.6 \leq d/t < 1.0$, in which dimension "t" is a total height of the electronic component in a third direction perpendicular to the first and second directions and dimension "d" is the length of the mounting portion in the second direction.

3. The electronic component of claim 1, wherein a length of the support portion in the second direction is greater than the length of the body in the second direction.

4. The electronic component of claim 3, wherein the length of the lower portion of the support portion in the second direction is greater than the length of the upper portion of the support portion in the second direction.

5. The electronic component of claim 3, wherein $1.0 < d/W \leq 1.3$, in which dimension "W" is a width of the electronic component in the second direction and dimension "d" is the length of the mounting portion in the second direction.

6. The electronic component of claim 1, wherein a length of the support portion in the second direction is uniform along a third direction perpendicular to the first and second directions.

7. The electronic component of claim 1, wherein the body includes a dielectric layer, and first and second internal electrodes alternately disposed while having the dielectric layer interposed therebetween.

8. The electronic component of claim 7, wherein the external electrodes include:
   head portions disposed on the opposing surfaces of the body in the first direction, respectively; and
   band portions extending from the head portions to portions of upper and lower surfaces of the body and to portions of opposite side surfaces of the body in the second direction, respectively.

9. The electronic component of claim 8, wherein a conductive adhesive portion is disposed between the head portions of the external electrodes and the support portion.

* * * * *